United States Patent [19]

Gebhard

[11] Patent Number: 4,925,614

[45] Date of Patent: May 15, 1990

[54] METHOD OF MAKING SHAPED BODIES FOR USE IN THE CONSTRUCTION TRADES FROM POWER-PLANT CLARIFIER SLUDGE

[75] Inventor: Georg Gebhard, Reichshof, Fed. Rep. of Germany

[73] Assignee: Rheinisch-Westfalisches Elektrizitatswerk Aktiengesellschaft, Essen, Fed. Rep. of Germany

[21] Appl. No.: 220,019

[22] Filed: Jul. 15, 1988

Related U.S. Application Data

[63] Continuation-in-part of Ser. No. 56,357, May 28, 1987, abandoned, which is a continuation of Ser. No. 828,841, Feb. 12, 1986, abandoned.

[30] Foreign Application Priority Data

Feb. 13, 1985 [DE] Fed. Rep. of Germany ....... 3504775

[51] Int. Cl.⁵ .................... B28B 3/00; C01B 17/00
[52] U.S. Cl. .................. 264/232; 52/DIG. 9; 264/86; 264/234; 264/333; 264/344; 423/242; 423/244
[58] Field of Search ........... 423/242 A, 244 A; 264/333, 232, 86, 234, 344; 52/DIG. 9

[56] References Cited

U.S. PATENT DOCUMENTS

| | | |
|---|---|---|
| 2,898,195 | 8/1959 | Banus et al. |
| 4,029,746 | 6/1977 | Taub et al. ............................ 425/363 |
| 4,134,774 | 1/1979 | Heese et al. ............................ 106/97 |
| 4,136,998 | 1/1979 | Bassier et al. ........................ 405/267 |
| 4,153,655 | 5/1979 | Minnick et al. ........................... 264/8 |
| 4,234,547 | 11/1980 | Urban ................................... 423/242 |
| 4,347,704 | 9/1982 | Marquardt et al. .... 203/DIG. 20 X |
| 4,454,101 | 6/1984 | Garrison et al. ............... 423/242 A |
| 4,503,020 | 3/1985 | Weissert et al. ................ 423/166 X |
| 4,540,555 | 9/1985 | Franke et al. .................. 423/242 A |
| 4,613,374 | 9/1986 | Smith ............................... 106/121 X |
| 4,627,970 | 12/1986 | Krüger ................................. 423/555 |

FOREIGN PATENT DOCUMENTS

| | | |
|---|---|---|
| 2642326 | 3/1978 | Fed. Rep. of Germany . |
| 2903580 | 8/1980 | Fed. Rep. of Germany ...... 423/242 |
| 57992 | 5/1975 | Japan . |
| 150416 | 9/1983 | Japan . |

OTHER PUBLICATIONS

Rudolf Von Miller, Lexikon der Energietechnik und Kraftmaschinen, Band 6, pp. 338 and 339, Deutsche Verlags-Anstalt Stuttgart.

Primary Examiner—Jan H. Silbaugh
Assistant Examiner—Karen D. Kutach
Attorney, Agent, or Firm—Herbert Dubno

[57] ABSTRACT

A power-plant clarifier sludge having the following dry composition:

| | |
|---|---|
| $SiO_2$ | 2 to 30 weight percent, |
| $Fe_2O_3$ | 2 to 20 weight percent, |
| $Al_2O_3$ | 0.5 to 5 weight percent, |
| CaO | 15 to 50 weight percent, |
| MgO | 1 to 8 weight percent, |
| MnO | 0.01 to 0.5 weight percent, |
| $Na_2O$ | 0.1 to 0.5 weight percent, |
| $K_2O$ | 0.1 to 1 weight percent, |
| $SO_3$ in sulfate | 0.1 to 2 weight percent, and |
| $CO_2$ in carbonate | 5 to 40 weight percent; | is used in the desulfurization of power-plant flue gas and the desulfurization slurry is dewatered and pressed into construction blocks.

5 Claims, 3 Drawing Sheets

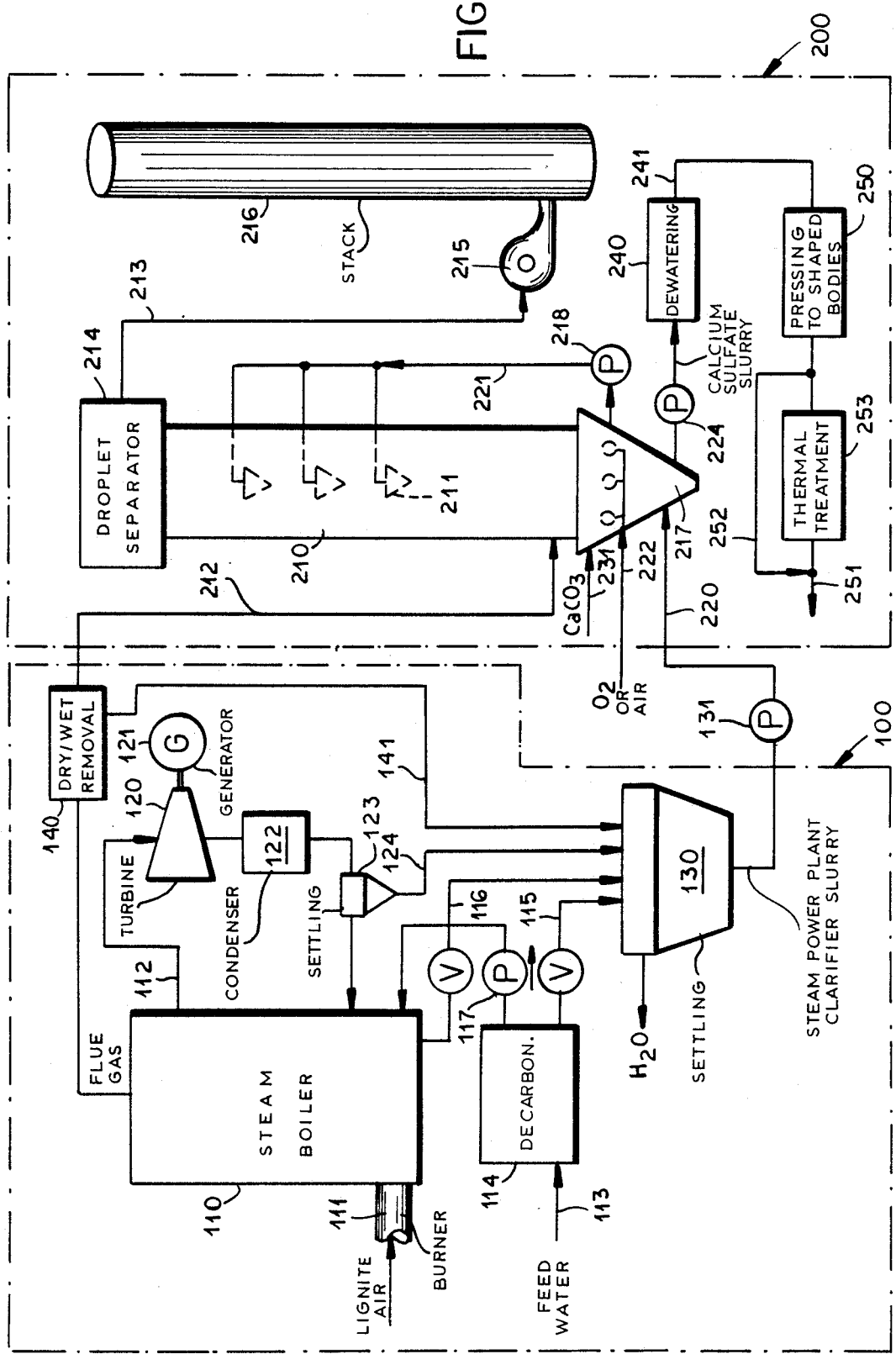

METHOD OF MAKING SHAPED BODIES FOR USE IN THE CONSTRUCTION TRADES FROM POWER-PLANT CLARIFIER SLUDGE

CROSS REFERENCE TO RELATED APPLICATIONS

This application is a continuation-in-part of my copending application Ser. No. 056,357 filed May 28, 1987, now abandoned, which is a continuation of Ser. No. 828,841, filed Feb. 12, 1986 now abandoned.

FIELD OF THE INVENTION

My present invention relates to a method of making a construction material and, more particularly, to the fabrication of shaped bodies for use in the construction industry, utilizing as a starting material a product which is obtained in the desulfurization of fossil-fuel flue gases from electric power plants and which also utilizes other wastes obtained in such power-plant operations, namely, the power-plant clarifier sludge.

BACKGROUND OF THE INVENTION

As described in the above-identified applications, which are hereby incorporated in their entirety by reference, in the operation of a steam power plant utilizing fossil fuel as the energy source, a desulfurization gypsum is produced.

Basically the desulfurization gypsum arises from the desulfurization of the flue gas before it is released into the atmosphere. The desulfurization can be effected, for example, in a wet process by treating the flue gas in a scrubber with an aqueous scrubbing solution containing an absorption medium which contains calcium or contributes calcium ions to an absorption reaction in which a calcium salt containing sulfur in the anion is obtained.

The desulfurization gypsum which is collected in the sump of the scrubber and which can be dewatered for use as a construction material is predominantly calcium sulfate dihydrate.

For the formation of shaped bodies of desulfurization gypsum for the construction trades, a variety of processes are available. In one group of such processes, the desulfurization gypsum is initially subjected to a heat treatment to transform the calcium sulfate dihydrate to the calcium sulfate semihydrate. The shaped bodies are then formed from the calcium sulfate semihydrate. Inert components can be mixed with the calcium sulfate semihydrate in this system.

In another group of processes, the desulfurization gypsum is mixed with power-plant fly ash before or after conversion to the calcium sulfate semihydrate. Shaped bodies such as bricks or blocks, pellets or the like are formed by the application of pressure.

In the operation of fossil fuel steam power plants, so-called power-plant clarifier sludge arises as a product which must be disposed of. A portion of this power-plant clarifier sludge derives from the so-called wet de-ashing as described, for example, in LUEGER "Lexikon der Energietechnik und Kraftmaschinen", Vol. 6, 1965, pages 338, 339. As explained in this work, the wet de-ashing results in the recovery of dust and fly ash carried by the flue gas.

Another portion of the power-plant clarifier sludge derives from the decarbonization of the steam power-plant feed water and other water utilized in such power plants (ibid, page 339). The decarbonization involves a separation of carbonates and hydrocarbonates from the water to yield a reduction in the total salt content of the feed water.

The wet de-ashing and the decarbonization are so carried out that a clarifier sludge arises which consists of solid particles of an especially fine grain structure, e.g. a particle size range of 1 to 50 micrometers, in water.

In the past, this power-plant clarifier sludge as generated in the operation of a steam power plant, was dewatered, for example in a filter press, at a comparatively high cost and disposed of at special waste disposition sites. It was considered to be practically worthless.

The composition of power-plant clarifier sludge varies and will depend, to the extent that it comprises wet de-ashing products, upon the composition of the fossil fuel and to the extent that it depends upon the decarbonization products, upon the composition of the feed water.

OBJECTS OF THE INVENTION

It is the principal object of the present invention to provide an improved method of making shaped bodies for the construction industry which will provide especially effective shaped bodies at low cost and at the same time eliminate a problem encountered with waste disposal of products resulting from power-plant operations.

Another object of the invention is to provide a method which can utilize with considerable effect, the power-plant clarifier sludge which has heretofore been considered a waste product.

Still another object of this invention is to advance the principles set forth in my above-identified copending application and the application upon which it, in turn, was based.

SUMMARY OF THE INVENTION

I have now discovered that it is possible, when the power-plant clarifier sludge has a certain composition, to greatly improve the fabrication of construction materials utilizing desulfurization gypsum, by employing that power-plant clarifier sludge as all or part of the absorption component of the desulfurizing process and thereby not only effectively dispose of that sludge, but simplify the production of a high-quality construction product.

According to the invention, therefore, a method of making shaped bodies for the construction industry comprises:

(a) recovering a power-plant clarifier sludge from a clarifier of a steam power plant with a chemical-analysis composition (dry) substantially of:

| | |
|---|---|
| $SiO_2$ | 2 to 30 weight percent, |
| $Fe_2O_3$ | 2 to 20 weight percent, |
| $Al_2O_3$ | 0.5 to 5 weight percent, |
| CaO | 15 to 50 weight percent, |
| MgO | 1 to 8 weight percent, |
| MnO | 0.01 to 0.5 weight percent, |
| $Na_2O$ | 0.1 to 0.5 weight percent, |
| $K_2O$ | 0.1 to 1 weight percent, |
| $SO_3$ in sulfate | 0.1 to 2 weight percent, and |
| $CO_2$ in carbonate | 5 to 40 weight percent; |

(b) feeding the power-plant clarifier sludge recovered in step (a) to a circulated scrubbing-water cycle of a wet desulfurization scrubber for fossil-fuel power plant flue gas as at least part of a sulfur oxide absorption component therefore;

(c) withdrawing a desulfurization sludge from said scrubbing-water cycle of said wet desulfurization scrubber which contains a solid phase consisting predominantly of calcium sulfate dihydrate;

(d) dewatering the desulfurization sludge withdrawn in step (c) to a predetermined residual moisture content; and (e) pressing the dewatered desulfurization sludge of step (d) into shaped bodies for the construction industry at a pressure in excess of 10 N/mm$^2$ to a green compressive strength in excess of 5 N/mm$^2$.

In other words, the clarifier sludge is utilized as a desulfurizing agent or a component of a desulfurizing agent which can contain calcium ions from other conventional absorbents utilized in the scrubbing water cycle of the wet desulfurization apparatus of the power plant.

Clarifier sludge can be used in the desulfurization of the flue gas of the same power plant from which the clarifier sludge derived or from another power plant and the desulfurization sludge which consists predominantly of calcium sulfate dihydrate, can be withdrawn from the scrubbing cycle, mechanically dewatered to a predetermined residual moisture content and pressed to shaped bodies with a pressing pressure in excess of 10 N/mm$^2$ to a green strength in excess of 5 N/mm$^2$.

The residual moisture content and the green strength can be adjusted, in accordance with the invention, by controlling the proportion of the power-plant clarifier sludge forming the desulfurization absorption component, the balance consisting usually of limestone.

In practice it has been found that with increasing proportions of the clarifier sludge, it is possible to adjust shaped bodies to maximum residual moisture content of about 40% and a green strength of about 10 N/mm$^2$.

In general, in accordance with the invention, the desulfurization sludge should be pressed with a residual moisture content of in excess of 25%. It is indeed surprising that the power-plant clarifier sludge can form a high quality desulfurization agent for the wet desulfurization of flue gases from the power-plant boiler combustion chamber. The desulfurization gypsum, surprisingly, consists predominantly of calcium sulfate dihydrate, although it also contains cement-like components, for example silicates, which contribute to the high quality of the shaped bodies which are produced.

The desulfurization sludge can thus be considered a raw material for use in the construction trades, either as an aggregate (after formation of pellets or the like) to concretes, plasters and the like, or as finished construction materials such as bricks or blocks. After pressing with the indicated residual moisture content, the blocks can set and be dried for use directly, although they can also be subjected to a heat treatment to form a semihydrate from the calcium sulfate dihydrate.

It has already been indicated that the power plant clarifier sludge can constitute the exclusive desulfurization agent in the scrubbing cycle for the power-plant flue gas. It can be admixed with or used in conjunction with classical desulfurizing agents such as the limestone previously mentioned, calcium oxide or calcium hydroxide.

In all cases, I have found it to be advantageous to utilize the desulfurization agent in a stoichiometric excess over the quantity required for the reaction with sulfur dioxide to form calcium sulfite with subsequent oxidation of the calcium sulfite to calcium sulfate.

The shaped bodies can be dried in air to the building blocks or bricks or aggregate as described. When the drying is carried out with heating, the heating may effect a transformation of the calcium sulfate dihydrate to the calcium sulfate semihydrate.

It is therefore a feature of the invention that the shaped bodies are subjected to a heat treatment for transformation of the calcium sulfate dihydrate to the calcium sulfate semihydrate.

BRIEF DESCRIPTION OF THE DRAWING

The above and other objects, features and advantages of the present invention will become more readily apparent from the following description, reference being made to the accompanying drawing in which:

FIG. 3 is a diagram of a plant showing application of the invention thereto.

SPECIFIC DESCRIPTION

Figure 1:
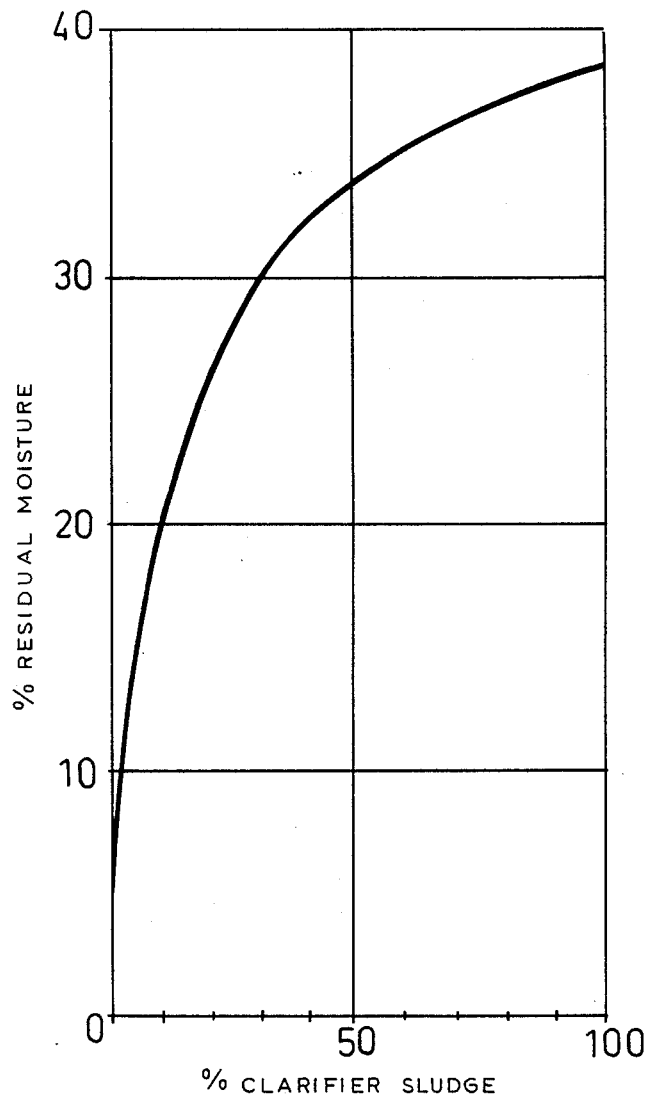
FIGS. 1 and 2 are graphs illustrating features described in conjunction with the specific example.

Referring first to FIG. 3, it can be seen that the plant has been subdivided into two sections 100 and 200, the section 100 representing the power plant itself while the section 200 represents the desulfurization unit. It will be understood that the desulfurization unit of any power plant may be supplied with clarifier-sludge solids of any other power plant although in the preferred embodiment illustrated, the clarifier-sludge solids used as an absorbent for the sulfur dioxide is derived from the same power plant.

The power plant may comprise a steam boiler 110 which has a combustion chamber and burner 111 which is supplied with lignite (brown coal) and air or oxygen so that steam is generated in the boiler 110 and a flue gas is produced which can be subjected to wet or dry dust removal at 140 before that flue gas is then subjected to desulfurization.

The wet or dry de-ashing residue is delivered at 141 to a clarifier 130 from which the solids are recovered and fed by a pump 131 to the desulfurization cycle as will be described.

The steam generated in the boiler 110 is fed at 112 to steam turbines represented at 120 driving the electric-current generators 121, the depleted steam passing to a condenser 122. The condensate is subjected to settling of solids at 123 and these solids contribute to the power-plant clarifier sludge, being delivered to the clarifier 130 as represented at 124.

The feed water for the boiler, supplied at 113 to the decarbonization unit 114, is supplied to the boiler by a pump 117 and the sludge which is separated from the feed water in the decarbonization unit is delivered at 115 to the clarifier 130.

A further de-ashing input to the clarifier 130 is formed by the line 116 which recovers ash from the boiler 110. The cooling water supplied to the condenser 122 may also be decarbonized in a similar way with the decarbonization residue being fed to the clarifier 130.

The steam power plant shown at 100 operates in the usual manner and when the clarifier sludge recovered from the clarifier 130 has the composition previously described, it can be fed effectively to the desulfurization cycle 200.

Desulfurization can be carried out in a scrubber 210 to which the flue gas is fed at 212 at a lower portion. A droplet separator is provided at 214 at the top of the scrubber and the flue gas after desulfurization is discharged via line 213 and a blower 215 to the stack 216 for release into the atmosphere.

The sump 217 of the scrubber collects the recycled scrubbing liquid which is a suspension of the desulfurization agents in water.

The scrubbing liquid is recirculated by a pump 218 and lines 221 to sprayheads 211 spaced apart at different levels of the scrubbing column.

The desulfurization agent consists at least in part of the clarifier sludge supplied via line 220, although other calcium-containing agents can be added as seen at 231 and oxygen or air may be bubbled into the sump as represented by line 222 to transform calcium sulfite to calcium sulfate.

This calcium sulfate slurry is withdrawn via pump 224 and is subjected to dewatering at 240. The dewatered solids at a predetermined residual moisture content are pressed to shaped bodies at 250 and these shaped bodies are recovered at 251 for use in construction.

Line 252 represents air drying of the shaped bodies without thermal transformation, while block 253 represents a thermal treatment of the shaped bodies to transform the calcium sulfate dihydrate to calcium sulfate semihydrate.

SPECIFIC EXAMPLE

In a wet desulfurization installation of a fossil-fuel electricity-generating power plant in which the fuel was lignite, the desulfurization medium was the power-plant clarifier sludge of this power plant and was introduced into the scrubber of the desulfurization installation.

The scrubber was supplied with the flue gas from the power-plant boiler at a temperature of about 160° C. after an initial dry-dust removal operation.

The flue gas desulfurization installation comprises, as has been described, a scrubbing tower to which the flue gas is introduced at the bottom and has a flue-gas outlet at its upper end. The scrubber is dimensioned to provide a residue time of about 15 seconds for the flue gas therein and a residence time of about 10 minutes for the scrubbing liquid.

The scrubber is provided with a number of atomizing nozzles for dispersing the scrubbing liquid into the gas, spaced apart over the height of the column, the nozzles being connected to a scrubbing liquid recirculating system drawing the scrubbing liquid from the sump of the column.

The sump of the column is also provided with means, as described, allowing the desulfurization slurry to be drawn off as well as means for feeding oxygen or air to the sump for oxidation.

The suspension which is recirculated in the scrubbing system is supplied with power-plant clarifier sludge, the composition of which is described below.

The solid content of the clarifier sludge introduced into the recirculating suspension was about 10%. The scrubbing circulation is effected so that the absorption agents carried by the recirculated scrubbing liquid and constituted of or made up in part of the clarifier sludge are present in an amount only about 1% in stoichiometric excess over the sulfur oxides contained in the flue gas.

The desulfurized flue gas is found to contain less than 380 mg/m$^3$ (STP) $SO_2$. The desulfurization slurry which results, consisting predominantly of calcium sulfate dihydrate and other solids from the clarifier sludge, is dewatered and pressed into blocks with a pressing pressure in excess of 10 N/mm$^2$, the blocks having a green strength in excess of 5 N/mm$^2$.

In Table 1 attached hereto, I have given the mineral content of the clarifier sludges which have been used, and in Table 2 the chemical compositions thereof in dry terms. In Table 2 the values are given for the product dried at 40° C. while the pH value is given for the wet clarifier sludge.

The compositions are given in terms of the various power plants from which they were derived.

The content of the power plant clarifier sludge contained in the circulated scrubbing liquid of the wet desulfurization unit was varied by combining it with other classical desulfurizing agents such as limestone, thereby altering the residual moisture content of the desulfurizing sludge after dewatering, as shown in FIG. 1.

In FIG. 1 the clarifier sludge content is plotted along the abscissa as a proportion of the total absorption agent used. Along the ordinate the moisture content of the dewatered sludge blocks is plotted.

With 100% clarifier sludge, the residual moisture is about 40% and the residual moisture decreases with decreasing clarifier sludge proportion rapidly and replacement of the clarifier sludge by another desulfurizing agent. This is a clear indication that the power plant clarifier sludge significantly alters both the chemistry and physics of the desulfurization slurry which is produced.

This point is also indicated in the green strength of the shaped bodies fabricated for a given pressure used in forming.

Figure 2:
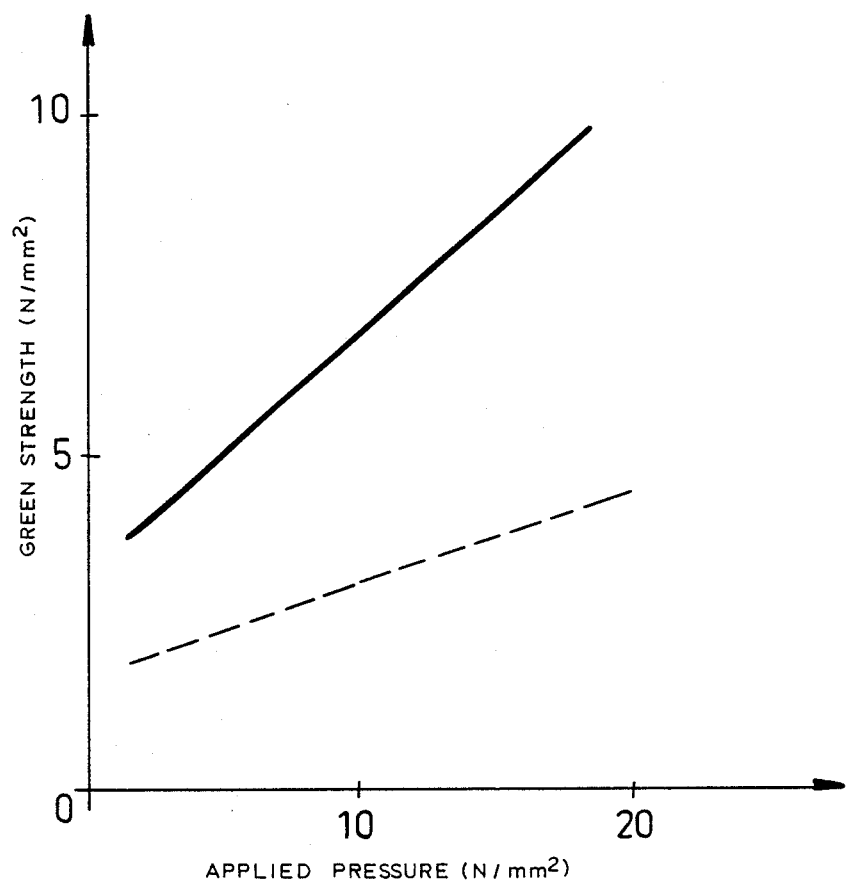

Referring to FIG. 2, where the present pressure for shaping the blocks is shown along the abscissa in N/mm$^2$ versus green strength in N/mm$^2$ plotted along the ordinate, the so-called seven-day value has been shown. The continuous upper curve illustrates the process of the invention in which 100% of the desulfurizing agent is constituted by the power-plant clarifier sludge which had the composition according to the invention given above. The lower, broken-line curve, shows the value when limestone is used as a desulfurizing agent. With the invention, there is 100% or better improvement.

TABLE I

MINERAL COMPOSITION OF THE WASTE MATERIAL
WASTE COMPOSITIONS FROM THE INDICATED
SOURCE LOCATION

| I Niederaussem | II Neurath | III Frimmersdorf | IV Weisweiler |
|---|---|---|---|
| $CaCO_3$ | $SiO_2$ | $CaCO_2$ | $CaCO_3$ |
| $SiO_2$ Quartz | $CaCO_3$ | $SiO_2$ Quartz | $SiO_2$ |
| $Mg_3Si_2O_5(OH)_4$ | $Ca_2Fe_2O_5$ | $Mg_3Si_2O_5(OH)_4$ | $Fe_2O_3$ |
| | $Mg_3Si_2O_5(OH)_4$ | | |
| | MgO | | |

TABLE II

CHEMICAL COMPOSITION OF THE WASTE MATERIAL
Composition in M. % at the indicated location

| Component | I Niederaussem | II Neurath | III Frimmersdorf | IV Weisweiler | Added $CaCO_3$ Powder |
|---|---|---|---|---|---|
| pH | 9.20 | 9.60 | 9.40 | 8.2 | 8.8–9.8 |
| $SiO_2$ | 16.10 | 29.20 | 10.40 | 2.64 | 0.48–5.02 |
| $Fe_2O_3$ | 17.8 | 10.60 | 2.61 | 2.61 | 0.10–1.04 |
| $Al_2O_3$ | 2.37 | 2.17 | 0.61 | 0.68 | 0.19–2.12 |
| CaO | 28.70 | 19.80 | 43.90 | 46.6 | 48.10–53.80 |
| MgO | 4.30 | 5.12 | 1.18 | 1.48 | 0.41–4.97 |
| MnO | 0.10 | 0.15 | 0.052 | 0.05 | 0.033–0.1 |
| $Na_2O$ | 0.24 | 0.20 | 0.12 | 0.16 | 0.006–0.098 |
| $K_2O$ | 0.53 | 0.56 | 0.29 | 0.11 | 0.021–0.20 |
| Sulfate $SO_3$ | 0.38 | 1.27 | 0.14 | 0.65 | 0.10–0.82 |
| Cl ppm | 1045 | 1180 | 568 | 1300 | — |
| $P_2O_5$ | 0.40 | 0.20 | 0.22 | 0.37 | — |
| $CO_2$ | 20.80 | 9.50 | 35.00 | 36.3 | 39.00–44.00 |
| C | 10.30 | 10.50 | 2.37 | 3.8 | n.n.–0.25 |
| $H_2O$ at °C. | 200/7.35 | 200/6.38 | 200/2.56 | 200/2.01 | — |

I claim:

1. A method of making shaped bodies for the construction industry, comprising the steps of:
   (a) recovering a power-plant clarifier sludge from a clarifier of a steam power plant with a chemical-analysis composition substantially of:

| | |
   |---|---|
   | $SiO_2$ | 2 to 30 weight percent, |
   | $Fe_2O_3$ | 2 to 20 weight percent, |
   | $Al_2O_3$ | 0.5 to 5 weight percent, |
   | CaO | 15 to 50 weight percent, |
   | MgO | 1 to 8 weight percent, |
   | MnO | 0.01 to 0.5 weight percent, |
   | $Na_2O$ | 0.1 to 0.5 weight percent, |
   | $K_2O$ | 0.1 to 1 weight percent, |
   | $SO_3$ in sulfate | 0.1 to 2 weight percent, and |
   | $CO_2$ in carbonate | 5 to 40 weight percent; |

(b) feeding the power-plant clarifier sludge recovered in step (a) to a circulated scrubbing-water cycle of a wet desulfurization scrubber for fossil-fuel power plant flue gas as at least part of a sulfur oxide absorption component therefore;
   (c) withdrawing a desulfurization sludge from the scrubbing-water cycle of the wet desulfurization scrubber which contains a solid phase consisting predominantly of calcium sulfate dihydrate;
   (d) dewatering the desulfurization sludge withdrawn in step (c) to a predetermined residual moisture content; and
   (e) pressing the dewatered desulfurization sludge of step (d) into shaped bodies for the construction industry at a pressure in excess of 10 $N/mm^2$ to a green compressive strength in excess of 5 $N/mm^2$.

2. The method defined in claim 1 wherein the sulfur oxide absorption component fed to the scrubber in step (b) consists entirely of the power-plant clarifier sludge.

3. The method defined in claim 1 wherein the sulfur oxide absorption component is fed to said scrubber in a superstoichiometric amount with respect to an amount stoichiometrically required to transform all the $SO_2$ in said flue gas to $CaSO_3$ in the cycle.

4. The method defined in claim 1, further comprising the steps of drying the pressed shaped bodies in air and using the dried bodies in construction without conversion of the calcium sulfate dihydrate to calcium sulfate semihydrate.

5. The method defined in claim 1, further comprising the step of subjecting the pressed shaped bodies to heating to transform the calcium sulfate dihydrate thereof to calcium sulfate semihydrate.

* * * * *